United States Patent
Shaffer et al.

(10) Patent No.: US 7,492,729 B2
(45) Date of Patent: *Feb. 17, 2009

(54) METHOD AND SYSTEM FOR RESERVING RESOURCES OF A MULTIPOINT CONFERENCE

(75) Inventors: Shmuel Shaffer, Palo Alto, CA (US); Labhesh Patel, Mountain View, CA (US); Steven L. Christenson, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 654 days.

This patent is subject to a terminal disclaimer.

(21) Appl. No.: 11/046,320

(22) Filed: Jan. 28, 2005

(65) Prior Publication Data

US 2006/0187859 A1    Aug. 24, 2006

(51) Int. Cl.
*H04L 12/16* (2006.01)
(52) U.S. Cl. .................. 370/260; 370/468; 709/204
(58) Field of Classification Search ............ None
See application file for complete search history.

(56) References Cited

U.S. PATENT DOCUMENTS

| | | | | |
|---|---|---|---|---|
| 5,483,587 | A | 1/1996 | Hogan et al. | 379/202 |
| 5,546,449 | A | 8/1996 | Hogan et al. | 379/202 |
| 5,903,637 | A | 5/1999 | Hogan et al. | 379/203 |
| 5,933,417 | A * | 8/1999 | Rottoo | 370/260 |
| 5,951,637 | A * | 9/1999 | Kuzma | 709/204 |
| 5,978,463 | A * | 11/1999 | Jurkevics et al. | 379/202.01 |
| 6,038,304 | A | 3/2000 | Hart | 379/202.01 |
| 6,105,054 | A * | 8/2000 | Kawashima | 709/204 |
| 6,195,117 | B1 * | 2/2001 | Miyazaki | 348/14.09 |
| 6,282,278 | B1 | 8/2001 | Doganata et al. | 379/202 |
| 6,324,169 | B1 | 11/2001 | Roy | 370/260 |
| 6,411,601 | B1 * | 6/2002 | Shaffer et al. | 370/230 |
| 6,466,252 | B1 * | 10/2002 | Miyazaki | 370/260 |
| 6,606,305 | B1 | 8/2003 | Boyle et al. | 370/260 |

(Continued)

FOREIGN PATENT DOCUMENTS

WO    WO 2004/114662    12/2004

OTHER PUBLICATIONS

Cisco Systems, Inc., "*Cisco Conference Connection*", Data Sheet, Internet Publication, http://www.cisco.com/warp/public/cc/pd/unco/cvco/prodlit/confr_ds.pdf, 7 pages, Jun. 2003.

(Continued)

*Primary Examiner*—Bob A Phunkulh
(74) *Attorney, Agent, or Firm*—Baker Botts L.L.P.

(57) ABSTRACT

A method for reserving conference resources includes communicating a conference notification to each of a plurality of conference invitees. The conference notification is associated with a multipoint conference. The method includes receiving, from each of a first number of the plurality of conference invitees, a response to the conference notification indicating that the invitee will participate on the multipoint conference. The first number of the plurality of invitees comprises participating invitees. The method includes automatically determining, based on the responses to the conference notifications, a sufficient amount of resources to allow the participating invitees to communicate on the multipoint conference. The method also includes automatically reserving the determined sufficient amount of resources and hosting the multipoint conference between the participating invitees using the reserved resources.

27 Claims, 2 Drawing Sheets

U.S. PATENT DOCUMENTS

| | | | |
|---|---|---|---|
| 6,744,460 B1 | 6/2004 | Nimri et al. | 348/14.11 |
| 6,772,436 B1* | 8/2004 | Doganata et al. | 725/106 |
| 6,798,753 B1* | 9/2004 | Doganata et al. | 370/260 |
| 6,807,563 B1 | 10/2004 | Christofferson et al. | 709/204 |
| 6,839,417 B2 | 1/2005 | Weisman et al. | 379/204.01 |
| 6,870,916 B2* | 3/2005 | Henrikson et al. | 379/202.01 |
| 6,876,734 B1 | 4/2005 | Summers et al. | 379/202.01 |
| 7,085,243 B2* | 8/2006 | Decker et al. | 370/261 |
| 7,213,050 B1* | 5/2007 | Shaffer et al. | 709/204 |
| 2002/0118688 A1 | 8/2002 | Jagannathan | 370/410 |
| 2004/0010548 A1 | 1/2004 | Hamilton et al. | 709/204 |
| 2004/0105395 A1* | 6/2004 | Friedrich et al. | 370/261 |
| 2004/0161080 A1 | 8/2004 | Digate et al. | 379/88.17 |
| 2006/0045253 A1* | 3/2006 | Bieselin et al. | 379/202.01 |

OTHER PUBLICATIONS

Latitude Communications, *"Meetingplace Web 4.0, Secure, cost-effective web conferencing for enterprises"*, © 2003 Latitude Communications, Inc., Internet Publication, http://www.latitude.com/pdfs/Web4.0.pdf, 2 pages, 2003.

U.S. Appl. No. 10/754,963 filed Jan. 8, 2004, entitled *"Method And System For Managing Conference Resources"*, 43 pages specification, claims and abstract, 2 pages of drawings, inventors Shmuel (nmi) Shaffer et al, Jan. 8, 2004.

Patent Application filed Jan. 28, 2005, entitled *"Method And System For Reserving Facility Resources For A Conference"*, 42 pages specification, claims and abstract, 2 pages of drawings, inventors Shmuel (nmi) Shaffer et al, Jan. 28, 2005.

Internet Engineering Task Force (IETF) Internet Draft, *"SIP For Presence,"* J. Rosenberg (Lucent Technologies, Bell Laboratories) and H. Schulzrinne (Columbia University), http://www.alternic.org/drafts/drafts-r-s/draft-rosenberg-sip-pip-00.txt, Nov. 13, 1998.

PCT, International Search Report and Written Opinion (ISA/EPO) for PCT/US2006/027779, 15 pages, Jan. 2, 2007.

U.S. Appl. No. 11/693,893, filed Mar. 30, 2007, entitled "Method and System for the Automatic Configuration of Conference Resources," 34 pages specification, claims and abstract, 2 pages of drawings, inventors David Cheng-Wei Lee et al, Mar. 30, 2007.

* cited by examiner

METHOD AND SYSTEM FOR RESERVING RESOURCES OF A MULTIPOINT CONFERENCE

TECHNICAL FIELD OF THE INVENTION

The present invention relates generally to communication systems and, more particularly, to a method and system for reserving conference resources.

RELATED APPLICATION

This application is related to U.S. patent application Ser. No. 11/046,067, entitled "METHOD AND SYSTEM FOR RESERVING FACILITY RESOURCES FOR A CONFERENCE,", filed concurrently with the present application.

BACKGROUND OF THE INVENTION

Historically, telecommunications have involved the transmission of voice and fax signals over a network dedicated to telecommunications, such as the Public Switch Telephone Network (PSTN) were are Private Brage Exchange (PBX). Similarly, data communications between computers have been historically transmitted on a dedicated data network, such a Local Area Network (LAN) or a Wide Area Network (WAN). Currently telecommunications and data transmissions are being merged into a integrated communication network using technology such as Voice over Internet Protocol (VOIP). Since many LANs and WANs transmit computer data using Intranet Protocol (IP), VOIP uses this existing technology to transmit voice and fax signals by converting these signals into digital data and encapsulating the data for transmission over an IP network.

Traditional communication networks often support multipoint conferences between a number of participants using different communication devices. A multipoint conference unit (MCU) is used to couple these devices, which allows users from distributed geographic locations to participate in the conference. The conference may be audio only (e.g., a teleconference) or may include video conferencing/broadcasting.

Conference systems utilize various resources when hosting a conference, and one of the key resources that conference administrators may need to indicate when setting up a conference call is the number of ports required for the conference. However, given the ambiguity regarding the availability of participants, conferences are usually setup reserving more ports than are required. Most meeting reservation systems (e.g., Microsoft Outlook) allow only three choices for an invited attendee to handle a meeting: accept, decline, or defer decision for later (e.g., "maybe" or "tentative"). These choices are insufficient to adequately book resources such as video ports, audio ports, seats, meals, rooms, or even to determine the expected attendance.

SUMMARY OF THE INVENTION

The present invention provides a method and system for reserving conference resources that substantially eliminates or reduces at least some of the disadvantages and problems associated with previous methods and systems.

In accordance with a particular embodiment of the present invention, a method for reserving conference resources includes communicating a conference notification to each of a plurality of conference invitees. The conference notification is associated with a multipoint conference. The method includes receiving, from each of a first number of the plurality of conference invitees, a response to the conference notification indicating that the invitee will participate on the multipoint conference. The first number of the plurality of invitees comprises participating invitees. The method includes automatically determining, based on the responses to the conference notifications, a sufficient amount of resources to allow the participating invitees to communicate on the multipoint conference. The method also includes automatically reserving the determined sufficient amount of resources and hosting the multipoint conference between the participating invitees using the reserved resources.

The conference notifications may comprise a plurality of attendance options, and each response to the conference notifications received from the first number of the plurality of conference invitees may comprise an attendance option selection. Automatically determining, based on the responses to the conference notifications, a sufficient amount of resources to allow the participating invitees to communicate on the multipoint conference may comprise automatically determining a sufficient amount of resources based on the attendance option selections to allow the participating invitees to communicate on the multipoint conference. The method may also include monitoring respective calendars of a second number of the plurality of conference invitees and automatically determining whether each of the second number of the plurality of conference invitees will participate on the multipoint conference based on their respective calendars. The determined conference invitees of the second number of the plurality of conference invitees who will participate may comprise participating invitees.

In accordance with another embodiment, a method for reserving conference resources comprises communicating a conference notification to each of a plurality of conference invitees. The conference notification comprises an option to attend a conference in person. The method includes receiving, from each of a first number of the plurality of conference invitees, a response to the conference notification indicating that the invitee will attend the conference. The first number of the plurality of invitees comprises attending invitees. The method also includes automatically determining, based on the responses to the conference notifications, a sufficient amount of resources for the attending invitees and automatically reserving the sufficient amount of resources for the conference.

The conference notifications may comprise an option to attend the conference via a telecommunications link. The at least one of the responses to the conference notifications received from the attending invitees may comprise a selection to attend the conference via a telecommunications link. Automatically determining, based on the responses to the conference notifications, a sufficient amount of resources for the attending invitees may comprise automatically determining, based on the received selections to attend the conference via a telecommunications link, a sufficient amount of multipoint conference resources to allow attendance via a telecommunications link. Automatically determining, based on the responses to the conference notifications, a sufficient amount of resources for the attending invitees may also comprise automatically determining meeting space sufficient to hold all invitees attending in person and automatically determining communication ports sufficient to allow participation by invitees attending via a telecommunications link. Automatically reserving the sufficient amount of resources for the conference may comprise automatically reserving the determined meeting space for the conference and automatically reserving the determined communication ports for the conference.

Technical advantages of particular embodiments include a method and system for reserving conference resources that automatically reserves various conference resources based on responses received from conference invitees. The reserved conference resources may include resources for multipoint conferences conducted over telecommunications networks, such as communication ports and digital signal processing (DSP) resources. The reserved conference resources may also include facility resources, such as meeting space, equipment, refreshments and security. Conference invitations may also include various attendance options or modes, and resources may be reserved according to attendance option selection. Particular embodiments provide greater accuracy in determining mode of attendance of invitees and allow for better resource utilization. Information from calendaring systems may be utilized to determining if a user will participate in a given conference and whether system resources are required.

Additionally, responsibility for indicating required system resources is moved to an end user who actually knows her needs rather than requiring the conference scheduler or system administrator to guess on resource requirements. Particular embodiments may also be used to indicate how many conference call users will dial in from a conference room and how many will dial in from other locations. More accurate attendance information makes it more feasible and simpler to move meetings to larger or smaller facilities as appropriate. In some embodiments, a conference scheduler can provide an initial resource request for planning purposes, and this information can be changed or overridden as invitees provide their responses.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION OF THE INVENTION

Figure 1:
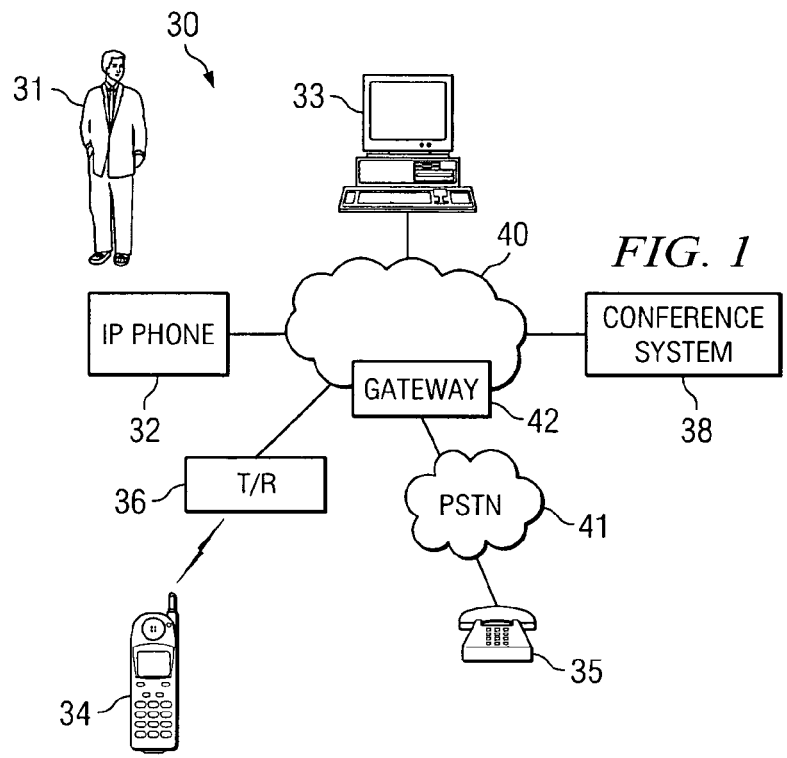
FIG. 1 illustrates a communication system with a plurality of endpoints and a conference system, in accordance with a particular embodiment of the present invention.

FIG. 1 illustrates a communication system 30 including a plurality of endpoints 32-35 having the ability to establish communication sessions with each other and/or a conference system 38. Such communication sessions may be established using communication networks 40, 41 and/or additional endpoints, components or resources coupled with communication networks 40 or 41. Conference system 38 plans and reserves resources for a conference between a plurality of participants. Such planning and resource reservation may be based on responses received from invited participants using endpoints 32-35. In particular embodiments, conference system 38 may comprise a multipoint conference unit (MCU) that hosts, or accommodates, multipoint conferences between and among endpoints 32-35. An MCU or other entity may be considered to be hosting a conference if it is one or more of the components that accommodates or otherwise provides conference resources to facilitate the conference.

In accordance with the present invention, systems and methods are provided that automatically reserve various conference resources based on responses received from conference invitees. The reserved conference resources may include resources for multipoint conferences conducted over telecommunications networks, such as communication ports and digital signal processing (DSP) resources. The reserved conference resources may also include facility resources, such as meeting space, equipment, refreshments and security. Conference invitations may also include various attendance options or modes, and resources may be reserved according to attendance option selection. Particular embodiments provide greater accuracy in determining mode of attendance of invitees and allow for better resource utilization. Information from calendaring systems may be utilized to determine if a user will participate in a given conference and whether system resources are required.

Additionally, responsibility for indicating required system resources is moved to an end user who actually knows her needs rather than requiring the conference scheduler or system administrator to guess on resource requirements. Particular embodiments may also be used to indicate how many conference call users will dial in from a conference room and how many will dial in from other locations. More accurate attendance information makes it more feasible and simpler to move meetings to larger or smaller facilities as appropriate. In some embodiments, a conference scheduler can provide an initial resource request for planning purposes, and this information can be changed or overridden as invitees provide their responses.

In some embodiments, the conference may be a multipoint conference such as a Meet Me Conference call. A Meet Me Conference call is an arrangement by which a user can dial a specific, pre-determined telephone number and enter a security access code to join a conference with other participants. The user is automatically connected to the conference through a conference bridge of conference system 38. Conference participants may call in at a preset time or may be directed to do so by a conference coordinator. Meet Me Conferences may be set up through a teleconferencing service provider, generally with the capability to conference thousands of participants in a single conference call.

Other types of conferences may also be accommodated within the teachings of the present invention. For example, in particular embodiments, a conference may comprise a physical meeting of a plurality of participants at a conference room or other location. As indicated above, the illustrated endpoints may be used to respond to conference invites transmitted from conference system 38. In some cases, a conference may comprise a combination of a multipoint Meet Me conference call and a physical meeting of a plurality of participants. For example, some conferences may include a communication session among a plurality of endpoints, where each endpoint is being used in a respective conference room by a plurality of participants.

Endpoints 32-35 may be any combination of hardware, software and/or encoded logic that provide communication services to a user. For example, endpoints 32-35 may include a telephone, a mobile phone, a computer running telephony software, a video monitor, a camera or any other communication hardware, software and/or encoded logic that supports the communication of media using communication network 40. In the illustrated embodiment, endpoints 32-34 include an internet protocol (IP) phone, a personal computer and wireless handset, respectively. A wireless base station transmitter/receiver 36 couples endpoint 34 with communication network 40. Endpoints 32-35 may also include unattended or automated systems, gateways, other intermediate components or other devices that can establish media sessions. Although FIG. 1 illustrates four endpoints 32-35, communication system 30 contemplates any number and arrangement of endpoints 32-35 for communicating media and participating in a conference. For example, the described technologies and techniques for establishing a communication session between or among endpoints 32-35 may be operable to establish a multipoint conference between more than two endpoints 32-35.

Although specific communication networks 40 and 41 are illustrated in FIG. 1, the term "communication network" should be interpreted as generically defining any network capable of transmitting audio and/or video telecommunications signals, data and/or messages. Communication network 40 may be any computer or communication network capable of coupling two or more endpoints 32-35, for communication. In the illustrated embodiment, communication network 40 is a wide area network (WAN) that enables communication between a plurality of endpoints distributed across multiple cities and geographic regions, and communication network 41 is a public switched telephone network (PSTN). However, communication networks 40 and/or 41 may be one or more networks, including the Internet, the public switched telephone network, local area networks (LANs), global distributed networks such as intranets, extranets or other form of wireless or wireline communication networks. Generally, communication networks 40 and 41 provide for the communication of packets, cells, frames and/or other portions of information (generally referred to as packets) between and among endpoints 32-35. Communication paths for the communication of such packets may include any combination of routers, hubs, switches, gateways (e.g., gateway 42) or other hardware, software or embedded logic implementing any number of communication protocols that allow for the exchange of packets in communication system 30.

In a particular embodiment, communication network 40 employs communication protocols that allow for the addressing or identification of endpoints 32-35 coupled to communication network 40. For example, using Internet protocol, each of the components coupled together by communication network 40 in communication system 30 may be identified in information directed using IP addresses. In this manner, communication network 40 may support any form and combination of point-to-point, multicast, unicast or other techniques for exchanging media packets among components in communication system 30.

Any given communication session between two of endpoints 32-35 may include the transfer of packets across one or more communication paths that couple endpoints 32-35 and/or MCU 38 across communication network 40. Such paths may include any combination of network components, gatekeepers, call managers, routers, hubs, switches, gateways, endpoints or other hardware, software or embedded logic implementing any number of communication protocols that allow for the exchange of packets in communication system 30.

Network 40 may be directly coupled to other IP networks including, but not limited to, the Internet. Since IP networks share a common method of transmitting data, telecommunication signals may be transmitted between telephony devices located on different, but interconnected, IP networks. In addition to being coupled to other IP networks, network 40 may also be coupled to non-IP telecommunication networks through the use of gateway 42. For example, network 40 is coupled to Public Switched Telephone Network (PSTN) 41. PSTN 41 includes switching stations, central offices, mobile telephone switching offices, pager switching offices, remote terminals and other related telecommunications equipment that are located across the country.

IP networks transmit data (including voice and video data) by placing the data in packets and sending each packet individually to the selected destination. Unlike a circuit-switched network (like PSTN 41), dedicated bandwidth is not required for the duration of a call or fax transmission over IP networks. Instead, each telephony device sends packets across the network as they become available for transmission. This feature makes bandwidth available for other data when voice or fax data is not being transmitted.

The technology that allows telecommunications to be transmitted over an IP network may be referred to as Voice over IP (VoIP). In the illustrated embodiment, endpoints 32-34 and MCU 38 are IP telephony devices. IP telephony devices have the capability of encapsulating a user's voice (or other inputs) into IP packets so that the voice can be transmitted over network 40. Similarly, IP telephony devices 32-34 have the capability of capturing and encapsulating video into IP packets so that the video can be transmitted over network 40. Conversely, IP telephony devices 32-34 have the capability of receiving audio or video IP packets from the network 40 and playing the audio or video data to a user.

A codec (coder/decoder) at the endpoint converts the voice, video or fax signals generated by the users of the telephony devices from analog media signals into digital form. The codec may be implemented either in software or as special-purpose hardware in the endpoints. In the case of an IP telephone, as the user speaks into the handset, the codec converts the analog voice signals into digital data. The digitally encoded data is then encapsulated into IP packets so that it can be transmitted over network 40. Conversely, another codec at the receiving endpoint converts the digital data into analog media for the users of the telephony devices. In the case of an IP telephone, digital data from IP encapsulated packets are received from the network 40. The codec at the receiving endpoint converts the digital voice, video or fax data from the network 40 into analog media to be played to the users of the telephony devices.

Gateway 42 may accomplish several functions, such as converting analog or digital circuit-switched data transmitted by PSTN 41 to packetized data transmitted by network 40 and vice-versa. When voice data packets are transmitted from network 40, gateway 42 retrieves the data contained in the incoming packets and converts this digital data to the analog or digital format used by the PSTN trunk to which gateway 42 is coupled. Since the digital format for voice transmissions over an IP network is often different than the format used on the digital trunks of PSTN 41, the gateway provides conversion between these different digital formats, which is referred to as transcoding. Gateway 42 also translates between the VOIP call control system and other signaling protocols (e.g., SS7, T1, ISDN, etc.), used in PSTN 41.

For voice transmissions from PSTN 41 to network 40, the process is reversed. In a particular embodiment, gateway 42 takes the incoming voice transmission (in either analog or digital form) and converts it into the digital format used by network 40. The digital data is then encapsulated into IP packets and transmitted over network 40.

Figure 2:
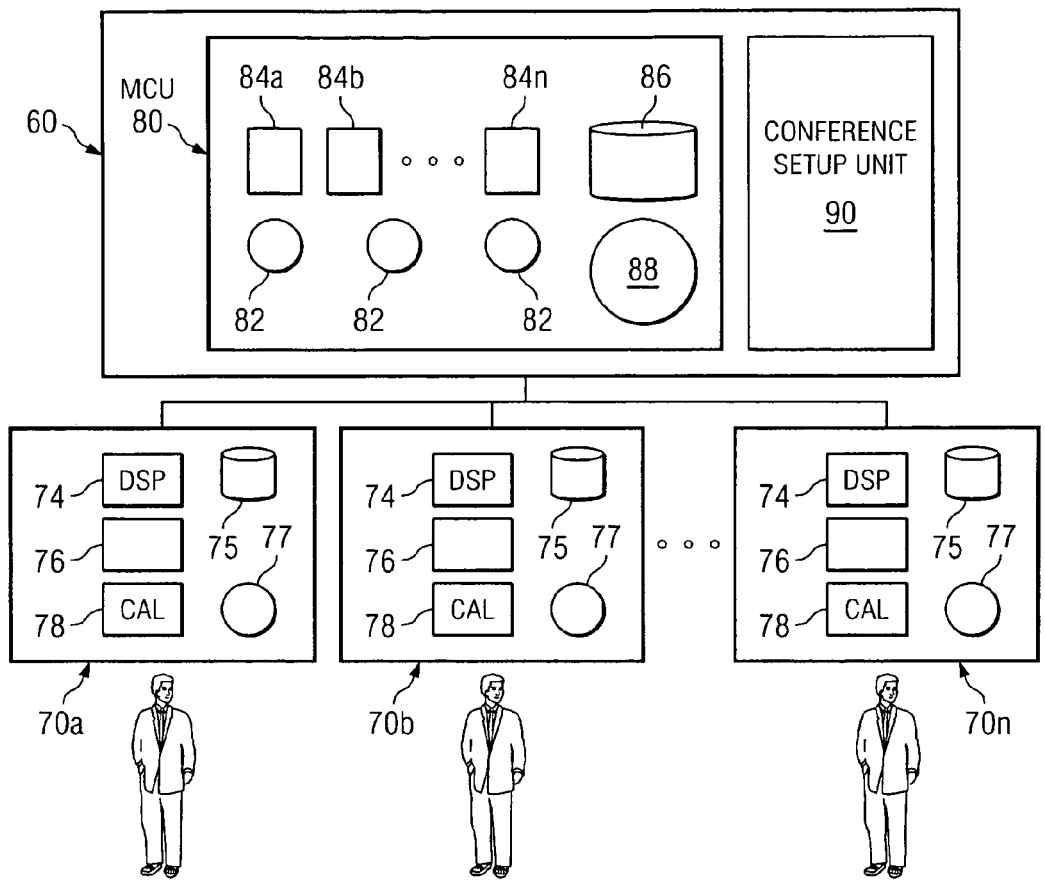
FIG. 2 illustrates a conference system with a multipoint conference unit and a conference setup unit, in accordance with a particular embodiment of the present invention.

FIG. 2 illustrates a conference system 60 coupled to a plurality of endpoints 70, in accordance with a particular embodiment. Conference system 60 provides conference setup and hosting services for invited conference participants. In the illustrated embodiment, conference system 60 includes an MCU 80 and a conference setup unit 90. MCU 80 provides multipoint conference functionality between participants using endpoints 70a-70n. Conference setup unit 90 invites participants to the multipoint conference and automatically reserves conference resources based on responses from invited participants.

Endpoints 70a-70n may be similar to one or more of the endpoints described above with respect to FIG. 1, such as IP phone endpoint 32. It should be understood that endpoints 70a-70n may be coupled to components of conference system 60 such as MCU 80 and conference setup unit 90 through one or more communication networks, such as communication networks 40 and 41 described above with respect to FIG. 1 which may include one or more WANs or LANs as indicated above.

In the illustrated embodiment, endpoints 70a-70n each include a digital signal processor (DSP) 74, memory 75, user interface 76, a processor 77 and a calendar 78. DSP 74 comprises a codec that converts voice, video or fax signals generated by the users of the telephony devices from analog media signals into digital form. The codec may be implemented either in software or as special-purpose hardware in the endpoints.

Memory 75 may include any form of volatile or nonvolatile memory including, without limitation, magnetic media, optical media, random access memory (RAM), read only memory (ROM), removable media or any other suitable local or remote memory component. Processor 77 may comprise one or more microprocessors, controllers or any other suitable computing devices or resources.

User interface 76 may include a microphone, video camera, speaker, keyboard, video display, LCD display and/or other device. In some embodiments, an endpoint's user interface 76 may be coupled with components that include a microphone, video camera, speaker, keyboard, video display and/or other device, rather than incorporating such components into the endpoint.

Calendar 78 may include a scheduling information for one or more users of the endpoint. The scheduling information may be used by a conference administrator or by a conference system to schedule a conference. In some embodiments, the conference system may view calendars 78 to determine whether invitees will attend a scheduled conference so that resources may be reserved accordingly.

MCU 80 acts as an intermediary during the multipoint communication conference, collects all audio and/or video streams transmitted by the participants through their endpoints and distributes such streams to participants of the multipoint conference at their endpoints. MCU 80 may include any bridging or switching device used in support of multipoint conferencing, including videoconferencing. In various embodiments, MCU 80 may include hardware, software and/or embedded logic. MCU 80 may be configured to support any number of conference endpoints communicating on any number of conferences, simultaneously. MCU 80 may be in the form of customer provided equipment (CPE, e.g., beyond the network interface) or may be embedded in a wide area network (WAN). Examples of multipoint conference unit standards are defined in ITU-T H.323, with T.120 describing generic conference control functions. MCU 80 utilizes certain resources to effectively host each conference.

In the illustrated embodiment, MCU 80 includes a plurality of digital signal processors (DSPS) 82, a plurality of communication ports 84a-84n, a processor 88 and memory 86. DSPs 82 include codecs that decode received media streams so that they may be bridged together to form a mixed stream that is coded by the DSPs for transmission to conference participants. In particular embodiments, MCU 80 may include software functioning as a DSP on a general purpose central processing unit, such as processor 88. Communication ports 84 may comprise audio and/or video communication ports.

Memory 86 may be any form of volatile or nonvolatile memory including, without limitation, magnetic media, optical media, random access memory (RAM), read only memory (ROM), removable media or any other suitable local or remote memory component. Processor 88 may be a microprocessor, controller or any other suitable computing device or resource.

As indicated above, conference setup unit 90 invites participants to a multipoint conference and automatically reserves conference resources based on responses from invited participants. The conference resources reserved by conference setup unit 90 may include any hardware or software component utilized by an MCU for hosting a conference between participants. Conference resources may include, for example, bandwidth, audio and video communication ports and DSP resources for transcoding or mixing. Resources available to MCUs may be utilized across any number of conferences taking place at the same time between any number of endpoints. For example, if an MCU has a certain number of communication ports available for conference use, one conference may utilize some of the communication ports while another conference taking place at the same time may utilize the rest of the communication ports. If conference participants leave a conference, the communication ports and other resources utilized by those conference participants may be made available to other conferences.

Conference setup unit 90 may include any suitable hardware, software and/or embedded logic to accomplish the functionality described herein. In some embodiments conference setup unit 90 may include an invite and a resource reservation module which may be integrated within a calendar system used by a conference moderator or administrator to invite participants and set up the multipoint conference. Thus, a calendaring system (whether distributed at a conference setup unit or at participant endpoints), may be integrated with a conference system to better utilize information available on a network.

In operation, a user setting up a multipoint conference to be hosted by MCU 80 may use conference setup unit 90 to invite a plurality of potential participants to the conference. The participants may be invited using in any suitable manner, such as e-mail, short message service (SMS), instant messaging, or phone call. The participants may be invited through a respective endpoints that may be used by the participant to participate on the multipoint conference, or the participants may be invited through a different endpoint than the one that may be used by the participant to participate on the conference. A conference administrator may use conference setup unit 90 to view calendars 78 of various participants to determine who may be available at a particular time to participate on the conference. The conference invitation may include a variety of options for an invitee, such as a manner of attendance or location of attendance. These options are discussed in further detail below.

Conference setup unit 90 reserves conference resources based on responses from invited participants to the conference invitations. For example, as an invitee accepts an invitation for a conference, the invitee may be prompted to enter her mode of participation and her requirement for system ports. Conference setup unit 90 may thus reserve the number of communication ports of MCU 80 hosting the conference that the participants collectively indicate that they will need, as opposed to the person who sets up the conference reserving a number of ports based on a "best guess" basis. As another example, if invitations to a multipoint conference are transmitted to 20 potential participants, 15 invitees respond that they will participate on the multipoint conference from respective endpoints 70 and 5 invitees respond that they will not participate on the conference, then conference setup unit 90 may automatically reserve 15 communication points 84 of MCU 80 for the conference based on the responses. Thus, the 15 conference participants may utilize their 15 respective endpoints coupled to MCU 80 to participate on the conference. Conference setup unit 90 may also reserve other conference resources such as appropriate DSP resources to host a multipoint conference between 15 participants. Automatically using responses from invited participants to reserve conference resources reduces the possibility that extraneous, resources not needed for the conference will be reserved by a conference administrator. In particular embodiments, an invited participant may update their initial invitation response (for example, a previous indication that one will not be able to participant may be changed to an indication that the invitee will attend the conference or vice versa), and conference setup unit 90 may automatically alter the conference resource reservation accordingly.

In accordance with some embodiments, conference setup unit 90 may provide a uniform resource locator (URL) for participants and may request that each participant enter their system resource requirements or desired attendance options for a specific conference through the URL. The URL for the specific conference may be presented to a participant either through a calendaring system, e-mail, text messaging or other means. The calendaring system may be integrated with the conferencing system and may provide periodic alerts to the participant to remind the participant to enter her port and resource requirements. The participant may be alerted that if she does not select proper resources, the MCU will not allocate ports or other resources for her. When the participant browses to the given URL, the system may present her with one or more of the attendance options, such as those described in more detail below. Other interaction mechanisms may include a Cisco IP phone service menu, client plug-ins to Microsoft Outlook or Notes, a custom meeting client, instant messaging with a meeting robot, an interactive voice response (IVR) system (through, for example, a telephone user interface), voice, e-mail, SMS, or personal workflow.

Some embodiments may utilize a personal workflow to automatically respond to incoming meeting requests using the "mode" that suits the invitee's meeting schedule (e.g., responding with an "in the office" mode when a meeting falls within an invitee's normal working hours or reserving a voice port when the e-mail system is set to "out of the office mode" and the invitee still accepts the conference invitation so that the participant may phone into an MCU). The workflow automation and the conference reservation system itself can further apply heuristics to adjust responses to suit the patterns of the invitee.

In accordance with particular embodiments, when a conference notification or invite is extended (through any suitable method such as calendar invite, e-mail, IM, SMS, etc.), the invitee may be provided with various options to indicate his likely manner of attendance. Some potential attendance possibilities may include: (1) meet in person (user may optionally select the location(s) at which the user plans to attend), (2) meet by phone (audio port only), (3) meet by video (audio and video ports), (4) meet by data collaboration, and (5) meet via instant messaging. Options 2-5 above could also include optional contact information to allow the conference administrator or moderator to initiate contact with the participant. In some embodiments, an invitee may select none, one or all of the above choices. A conference consisting solely of multipoint participation through an MCU may not include, for example, option 1 above.

In some embodiments, various location attendance modes may be offered in connection with a conference notification or invite. These location attendance modes may be offered either in addition to, or in some cases instead of, the manners of attendance listed as possibilities above. Some location attendance modes may include (a) in office (may be consistent with all of manners of attendance 1-5 above), (b) in person (may be consistent with manner of attendance 1 above), (c) from a conference room (may be consistent with manners of attendance 2-5 above), (d) road warrior (may be consistent with manners of attendance 2 and 4 above), (e) from home (may be consistent with manners of attendance 2, 4 and 5 above), and (f) custom/unsure.

In particular embodiments, a "road warrior" may indicate to a conference system that he will be in a hotel that has a high surcharge for calls and may ask that an MCU of the conference system place a call to him rather than wait for him to call into a scheduled conference. As the participant enters the hotel he can provide his phone number to the conferencing system via the web, an IVR system, a short message service or through any other suitable method In some embodiments, a conference system administrator, moderator and/or conference scheduler may select the preferred behavior when invitees do not respond. For example, a non-responding invitee might be denied all resources or may have only audio resources allocated. In accordance with other embodiments, the conference system administer, moderator and/or conference scheduler may configure the conference system with an initial number of ports/resources. As the conference invitees provide their attendance input, the information from the invitees takes precedence and overrides the initial "best guess" reservations of the administrator, moderator and/or scheduler. In some embodiments the conference administrator may enter attendance information for a specific invitee. This feature may be important in particular circumstances, such as when the specific invitee is on vacation.

Figure 3:
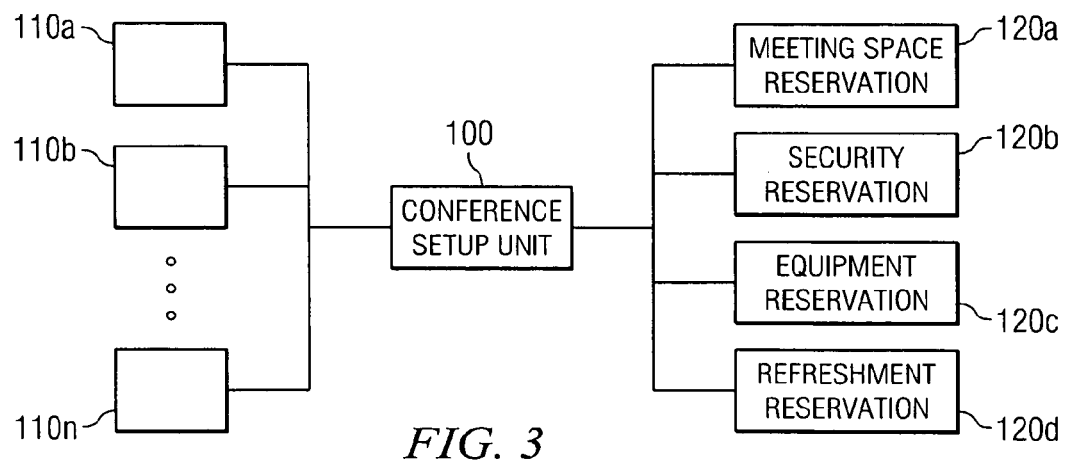
FIG. 3 illustrates a conference setup unit and resource reservation systems, in accordance with a particular embodiment of the present invention.

FIG. 3 illustrates a conference setup unit 100 coupled to a plurality of endpoints 110 and a plurality of reservation systems 120, in accordance with a particular embodiment. Conference setup unit 100 invites participants to a conference and automatically reserves conference resources based on responses from invited participants. The conference may include a physical meeting of conference participants, for example in a conference room. In some cases, a conference may comprise a plurality of participants physically meeting in multiple conference rooms via one or more telecommunications connections (e.g., audio, video, computer) between the conference rooms.

Conference setup unit 100 may invite participants to a conference by communicating an invite to endpoints 110 of the participants. Endpoints 110*a*-110*n* may be similar to endpoints 70 described above with respect to FIG. 2 and may be coupled to conference setup unit 100 through one or more communication networks, such as communication networks 40 and 41 described above with respect to FIG. 1.

Conference setup unit may include any suitable processors or memory modules or other hardware, software and/or embedded logic to accomplish the functionality described herein. Conference setup unit 100 may include an invite module and a resource reservation module for invite and resource reservation functionality, respectively. Conference setup unit 100 may also include a calendar to coordinate conferences and conference invites with calendars or schedules of potential participants.

A conference invite communicated to potential conference participants by conference setup unit 100 may include various attendance options, including various manners of attendance as discussed above. For example, a conference invite may include an option for an invitee to choose from among a plurality of conference rooms from which the invitee will participate.

As discussed above, conference setup unit 100 automatically reserves resources based on responses received from invitees for conferences. For conferences that include physical meetings, the resources that conference setup unit 100 may reserve may include meeting space resources (e.g., conference rooms), security resources (e.g., security personnel), equipment resources (e.g., tables, chairs, audio/video equipment, telecommunications equipment, presentation boards, etc.) and refreshment resources (e.g., meals, snacks, etc.).

Conference setup unit 100 may be coupled to various resource reservation systems 120 to reserve applicable resources for a conference. Reservation systems 120 may actually make the arrangements required to ensure that the appropriate resources are available at the conference. Such arrangements may be made either automatically through one or more computer or network systems or with the assistance of a resource reservation assistant. For example, if 20 invitees responded that they would attend a lunch conference in conference room A, then conference setup unit 100 may automatically reserve (i) conference room A with meeting space reservation 120a, (ii) seats and tables for those 20 people and any required audio/video equipment with equipment reservation 120c, and (iv) lunches for 20 people with refreshment reservation 120d. Equipment reservation 120c may then, for example, automatically transmit a request to a facility equipment manager a request for the reserved equipment, and refreshment reservation 120d may, for example, automatically transmit to a caterer or other facility a request for the lunches.

In some cases, the reservation of a particular conference room may depend on the number of participants responding that they will attend the conference in person. For example, if 30 invitees respond that they will attend in person, then conference setup unit 100 may reserve a conference room that holds at least 30 people, foregoing conference rooms that are not able to hold 30 people.

In some embodiments, a conference system may not reserve any physical meeting room until two or more participants indicate that they will attend personally in the same geographic area. For example, a conference system may invite participants A, B, C, D and E, all of whom work on the same floor in the same building, to a conference. Participants A, C and D may each respond that they will be out of the office and will thus call into the conference system for the conference from their home, cell or other phone. Participants B and E may each respond that they will attend the scheduled conference from the building at which they work. In this case, the conference system may reserve physical meeting space, such as a conference room on the floor on which participants B and E work so that these participants may participate on the conference using a phone or other endpoint in such conference room. If, for example, participant E had responded that he could not attend the conference leaving only participant B to attend from the building at which participants A, B, C, D and E work, then the conference system may not reserve a conference room as mentioned above since participant B may be able to call into the scheduled conference from a phone, computer or other endpoint in the office of participant B.

As indicated above, the systems and functionality described with respect to various figures and embodiments described herein may be combined as appropriate. Conference attendance options discussed with herein with respect to conference notifications or invitations may be used in any suitable embodiment. As an example of a combination of functionality described herein, a conference setup unit may communicate a conference invite to 30 potential participants. The invite may allow for any of a number of participation methods, such as participation from a conference room, an office phone, a home phone or by computer. Assume that the office of 10 invitees is at facility A in one geographic region, and that the office of the other 20 invitees is at facility B in another geographic region. Assume that out of the 10 invitees at facility A, 6 respond that they will attend the conference at a conference room at facility A, 3 respond that they will attend via phone from their respective offices and 1 responds that he will attend via a cell phone from outside the office. Assume that out of the 20 invitees at facility B, 15 respond that they will attend the conference at a conference room at facility B and 5 respond that they will attend via phone from their respective offices. The conference setup unit may then, based on these responses, automatically reserve a conference room at facility A that will hold at least 6 participants and automatically reserve a conference room at facility B that will hold at least 15 participants. The conference setup unit may also automatically reserve appropriate equipment at each of those conference rooms, such as tables, chairs and audio/video equipment through which the attending participants may communicate on the conference. The conference setup unit may also automatically reserve any required security personnel and refreshments for those attending at the conference rooms. In addition, the conference setup unit may reserve appropriate MCU resources so that an MCU can host a multipoint conference between the reserved conference room at facility A (where 6 participants will attend), the reserved conference room at facility B (where 15 participants will attend), the 3 participants from the group of 10 that will attend from their respective offices, the 1 participant from the group of 10 that will attend on his cell phone and the 5 participants from the group of 20 that will attend from their respective offices. Thus, as an example, this MCU resource reservation may include a reservation of 11 communication ports and suitable DSP resources.

Figure 4:
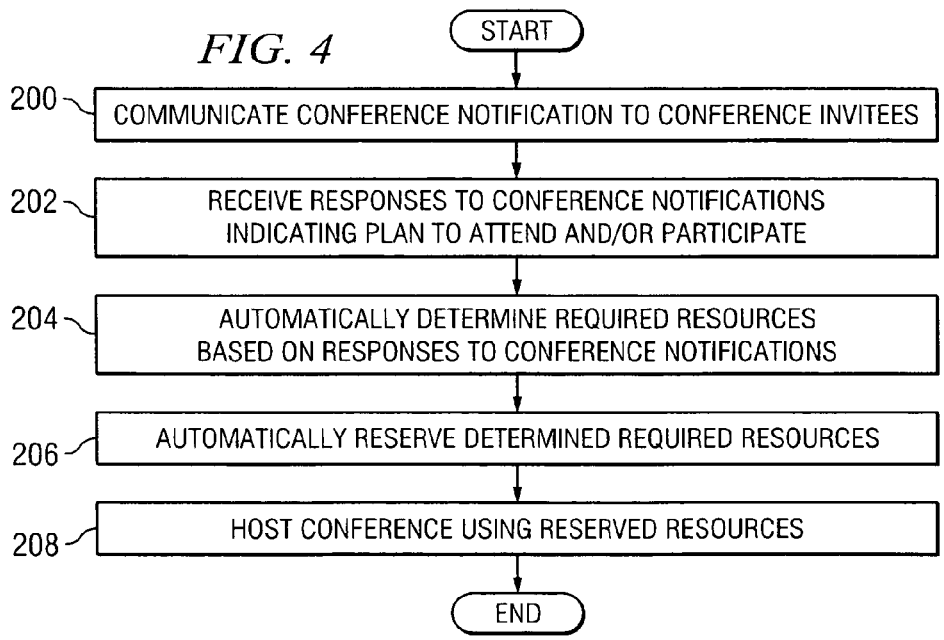
FIG. 4 is a flowchart illustrating a method for reserving conference resources, in accordance with a particular embodiment of the present invention.

FIG. 4 is a flowchart illustrating a method for reserving conference resources, in accordance with a particular embodiment. The method begins at step 200 where a conference notification is communicated to a plurality of conference invitees. The conference notification may include various attendance options, such as manners of attendance and locations from which a participant may attend. For example, the conference notification may include an option to attend the conference via a telecommunications link (e.g., from an invitee's office, home or cellular phone or from another endpoint associated with the invitee) or in person (e.g., at a conference room). The conference notification may relate to a conference hosted by a multipoint conference unit if, for example, invitees are offered the option to attend the conference via a telecommunications link. An in person conference may become a multipoint conference if invitees select to attend from different places, such as different conference rooms in different geographic regions.

At step 202, responses are received from at least some of the conference invitees that indicate that the invitee will participate in and/or attend the conference. The responses may also include selections of a desired mode of attendance from various options offered in the conference notification. Responses may also include an identification by the invitee of required resources, such as audio and/or video communication ports. Responses may be received through any suitable means, such as e-mail, IM or SMS.

In some cases, responses may be automated based on a workflow, such as a personal workflow of a particular invitee. For example, if a conference notification relates to a conference scheduled when an invitee is scheduled to be in the office, then the personal workflow of the invitee may call for an automatic response that the invitee will attend the conference. If, however, the invitee is scheduled to be in a meeting, then the personal workflow may call for an automatic response that the invitee will not attend the conference. If, for example, the invitee is scheduled to be out of the office, then the workflow may call for an automatic response indicating that the invitee will call into the conference and may thus automatically reserve voice communication ports and/or DSP resources for the invitee's participation in the conference. An invitee's personal workflow may be used to automatically respond to a conference notification in any suitable manner or circumstance.

At step 204, a sufficient amount of resources to allow participating invitees to communicate on and/or attend the conference are automatically determined based on the responses to the conference notifications. For example, if the conference notification includes an option to attend a multipoint conference via phone, then the system may identify all invitees who have indicated in their response that they desire to attend the conference via phone (e.g., home phone, cellular phone, office phone) and may determine a number of communication ports needed to support such attendance. If a conference notification includes an option to attend in a conference room, then the system may determine the size of conference room needed to host all those that have indicated their plan to attend. Other facility resources that may be needed for an in-person conference may include equipment resources, refreshments and security personnel.

In some cases the types of resources reserved based on invitee responses may be automatically determined based on an event-specific workflow. For example, a sales conference notification may be associated with a specific workflow that calls for particular resources, such as particular refreshments or equipment. In this case, the conference system may execute an event-specific workflow associated with a particular conference to determine the appropriate resources needed based on the responses received from invitees. A system administrator may design and associate the event-specific workflow with the conference at any suitable time.

At step 206, the system automatically reserves the determined sufficient amount of resources. At step 208, the conference is hosted between the conference participants using the reserved resources. As indicated above, the conference may be hosted by a multipoint conference unit, a physical meeting space (e.g., a conference room), or a combination of the two.

Some of the steps illustrated in FIG. 4 may be combined, modified or deleted where appropriate, and additional steps may also be added to the flowchart. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within a conference system, a conference setup unit, an MCU and participant endpoints, these elements may be combined, rearranged or positioned in order to accommodate particular routing architectures or needs. In addition, any of these elements may be provided as separate external components to a conference system, a conference setup unit, an MCU or a participant endpoint where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for reserving conference resources, comprising:
   communicating a conference notification to each of a plurality of conference invitees, the conference notification associated with a multipoint conference;
   receiving, from each of a first number of the plurality of conference invitees, a response to the conference notification indicating that the invitee will participate on the multipoint conference, the first number of the plurality of invitees comprising participating invitees;
   automatically determining, based on the responses to the conference notifications, a sufficient amount of resources to allow the participating invitees to communicate on the multipoint conference;
   automatically reserving the determined sufficient amount of resources;
   hosting the multipoint conference between the participating invitees using the reserved resources; and
   wherein:
      the conference notifications comprise a plurality of attendance options;
      each response to the conference notifications received from the first number of the plurality of conference invitees comprises an attendance option selection; and
      automatically determining, based on the responses to the conference notifications, a sufficient amount of resources to allow the participating invitees to communicate on the multipoint conference comprises automatically determining a sufficient amount of resources based on the attendance option selections to allow the participating invitees to communicate on the multipoint conference.

2. The method of claim 1, wherein automatically determining a sufficient amount of resources to allow the participating invitees to communicate on the multipoint conference comprises automatically determining a sufficient amount of communication ports to allow the participating invitees to communicate on the multipoint conference.

3. The method of claim 1, wherein automatically determining a sufficient amount of resources to allow the participating invitees to communicate on the multipoint conference comprises automatically determining a sufficient amount of digital signal processing (DSP) resources to allow the participating invitees to communicate on the multipoint conference.

4. The method of claim 1, wherein:
the plurality of attendance options comprise an option for communication ports;
the attendance option selections comprise selections of communication ports; and
automatically determining a sufficient amount of resources comprises automatically determining a sufficient amount and type of communication ports based on the selections of communication ports.

5. The method of claim 4, wherein the option for communication ports comprises an option for at least audio and video communication ports.

6. The method of claim 1, wherein the plurality attendance options comprise a phone attendance option, a video attendance option and an instant messaging attendance option.

7. The method of claim 1, wherein the plurality of attendance options comprise a plurality of location options for attendance.

8. The method of claim 1, wherein receiving, from each of a first number of the plurality of conference invitees, a response to the conference notification comprises receiving, from each of a first number of the plurality of conference invitees a response to the conference notification through a conference uniform resource locator (URL) presented to the plurality of conference invitees.

9. The method of claim 1, further comprising:
monitoring respective calendars of a second number of the plurality of conference invitees; and
automatically determining whether each of the second number of the plurality of conference invitees will participate on the multipoint conference based on their respective calendars, the determined conference invitees of the second number of the plurality of conference invitees who will participate comprising participating invitees.

10. The method of claim 1, wherein at least one of the responses to the conference notification received from a conference invitee is received as an automatic response based on a personal workflow and schedule of the conference invitee.

11. A system for reserving conference resources, comprising:
an interface operable to:
communicate a conference notification to each of a plurality of conference invitees, the conference notification associated with a multipoint conference;
receive, from each of a first number of the plurality of conference invitees, a response to the conference notification indicating that the invitee will participate on the multipoint conference, the first number of the plurality of invitees comprising participating invitees;
a processor coupled to the interface, the processor operable to:
automatically determine, based on the responses to the conference notifications, a sufficient amount of resources to allow the participating invitees to communicate on the multipoint conference;
automatically reserve the determined sufficient amount of resources; and
host the multipoint conference between the participating invitees using the reserved resources; and
wherein:
the conference notifications comprise a plurality of attendance options;
each response to the conference notifications received from the first number of the plurality of conference invitees comprises an attendance option selection; and
a processor operable to automatically determine, based on the responses to the conference notifications, a sufficient amount of resources to allow the participating invitees to communicate on the multipoint conference comprises a processor operable to automatically determine a sufficient amount of resources based on the attendance option selections to allow the participating invitees to communicate on the multipoint conference.

12. The system of claim 11, wherein a processor operable to automatically determine a sufficient amount of resources to allow the participating invitees to communicate on the multipoint conference comprises a processor operable to automatically determine a sufficient amount of communication ports to allow the participating invitees to communicate on the multipoint conference.

13. The system of claim 11, wherein a processor operable to automatically determine a sufficient amount of resources to allow the participating invitees to communicate on the multipoint conference comprises a processor operable to automatically determine a sufficient amount of digital signal processing (DSP) resources to allow the participating invitees to communicate on the multipoint conference.

14. The system of claim 11, wherein:
the plurality of attendance options comprise an option for communication ports;
the attendance option selections comprise selections of communication ports; and
a processor operable to automatically determine a sufficient amount of resources comprises a processor operable to automatically determine a sufficient amount and type of communication ports based on the selections of communication ports.

15. The system of claim 14, wherein the option for communication ports comprises an option for at least audio and video communication ports.

16. The system of claim 11, wherein the plurality attendance options comprise a phone attendance option, a video attendance option and an instant messaging attendance option.

17. The system of claim 11, wherein the plurality of attendance options comprise a plurality of location options for attendance.

18. The system of claim 11, wherein an interface operable to receive, from each of a first number of the plurality of conference invitees, a response to the conference notification comprises a processor operable to receive, from each of a first number of the plurality of conference invitees a response to the conference notification through a conference uniform resource locator (URL) presented to the plurality of conference invitees.

19. The system of claim 11, wherein the processor is further operable to:
monitor respective calendars of a second number of the plurality of conference invitees; and
automatically determine whether each of the second number of the plurality of conference invitees will participate on the multipoint conference based on their respective calendars, the determined conference invitees of the second number of the plurality of conference invitees who will participate comprising participating invitees.

20. The system of claim 11, wherein the interface is operable to receive at least one of the responses to the conference notification from a conference invitee as an automatic response based on a personal workflow and schedule of the conference invitee.

21. A system for reserving conference resources, comprising:
- means for communicating a conference notification to each of a plurality of conference invitees, the conference notification associated with a multipoint conference;
- means for receiving, from each of a first number of the plurality of conference invitees, a response to the conference notification indicating that the invitee will participate on the multipoint conference, the first number of the plurality of invitees comprising participating invitees;
- means for automatically determining, based on the responses to the conference notifications, a sufficient amount of resources to allow the participating invitees to communicate on the multipoint conference;
- means for automatically reserving the determined sufficient amount of resources;
- means for hosting the multipoint conference between the participating invitees using the reserved resources; and wherein:
- the conference notifications comprise a plurality of attendance options;
- each response to the conference notifications received from the first number of the plurality of conference invitees comprises an attendance option selection; and
- means for automatically determining, based on the responses to the conference notifications, a sufficient amount of resources to allow the participating invitees to communicate on the multipoint conference comprises means for automatically determining a sufficient amount of resources based on the attendance option selections to allow the participating invitees to communicate on the multipoint conference.

22. The system of claim 21, wherein:
- the plurality of attendance options comprise an option for communication ports;
- the attendance option selections comprise selections of communication ports; and
- means for automatically determining a sufficient amount of resources comprises means for automatically determining a sufficient amount and type of communication ports based on the selections of communication ports.

23. The system of claim 22, wherein the option for communication ports comprises an option for at least audio and video communication ports.

24. The system of claim 21, wherein the plurality of attendance options comprise a plurality of location options for attendance.

25. The system of claim 21, wherein means for receiving, from each of a first number of the plurality of conference invitees, a response to the conference notification comprises means for receiving, from each of a first number of the plurality of conference invitees a response to the conference notification through a conference uniform resource locator (URL) presented to the plurality of conference invitees.

26. The system of claim 21, further comprising:
- means for monitoring respective calendars of a second number of the plurality of conference invitees; and
- means for automatically determining whether each of the second number of the plurality of conference invitees will participate on the multipoint conference based on their respective calendars, the determined conference invitees of the second number of the plurality of conference invitees who will participate comprising participating invitees.

27. The system of claim 21, wherein at least one of the responses to the conference notification received from a conference invitee is received as an automatic response based on a personal workflow and schedule of the conference invitee.

* * * * *